United States Patent [19]
Kitai

[11] 3,785,259
[45] Jan. 15, 1974

[54] DAYLIGHT AND FLASH PHOTOGRAPHY CHANGE-OVER ELECTRICALLY-OPERATED SHUTTER

[75] Inventor: Kiyoshi Kitai, Tokyo, Japan

[73] Assignee: Seiko Koki Kabushiki Kaisha, Tokyo, Japan

[22] Filed: Dec. 21, 1972

[21] Appl. No.: 317,710

[30] Foreign Application Priority Data
Dec. 21, 1971  Japan............................ 46-103815

[52] U.S. Cl. ............................................. 95/10 CT
[51] Int. Cl. ............................................. G03b 7/08
[58] Field of Search...................... 95/10 CT, 53 EB

[56] References Cited
UNITED STATES PATENTS
3,535,989   10/1970   Kitai .................................... 95/10
3,650,193   3/1972    Shimizu ............................ 95/10 X Primary Examiner—Samuel S. Matthews
Assistant Examiner—Michael L. Gellner
Attorney—Robert E. Burns et al.

[57] ABSTRACT

An electrically-operated shutter provided with a change-over device or arrangement for effecting daylight and flash photography automatically shifting from a daylight mode to a flash photography mode as a function of the detected brightness level of the field being photographed. One embodiment provides for manually presetting the camera for flash photography which is then automatically carried out with an automatic change-over from a daylight photography mode to a flash photography mode. When carrying out daylight photography the power source energy is used in control and in energizing an electromagnet that controls the exposure termination under control of a delay circuit. When taking flash exposure the delay circuit is not employed and a fixed exposure time is used. The power supply is then used to energize the flashbulb and the accuracy of the shutter timing is unaffected as might be the case if the power source were energizing both the flashbulb and driving or energizing the shutter. The same shutter-operating elements are used in both modes of operation and the change-over arrangement eliminates the use of the delay circuit when the brightness level is below a predetermined level so that flash photography becomes necessary.

8 Claims, 6 Drawing Figures 3,785,259

DAYLIGHT AND FLASH PHOTOGRAPHY CHANGE-OVER ELECTRICALLY-OPERATED SHUTTER

BACKGROUND OF THE INVENTION

This invention relates generally to cameras and more particularly to cameras having an electrically operated camera shutter for daylight and flash photography with a change-over arrangement executing the change from one mode of operation to another automatically or manually.

Cameras with electrically operated shutters operable for daylight photography which take photographic exposures with timed exposure periods as a function of the brightness of a subject are known. These cameras may have a delay circuit including a photoconductive cell for carrying out the daylight photograph and a separate photoconductive cell for flash photography in which case a change-over switch takes the delay circuit out of circuit and a fixed resistance and a fixed time exposure is used when flash photography is being effected.

Moreover, cameras are known in which the shutter will operate for daylight photography if a certain brightness level exists, and below that brightness a flash device is placed in circuit to enable taking of flash photographs.

These various types of cameras must be highly reliable as to the change-over switch arrangement for changing the photoconductive cell circuitry to a fixed resistance circuit controlling the exposure and the proper arrangement of the changeover switch requires space as well as additional cost. Moreover, if a battery is used as a power source for driving the shutter and as a source of power for the flashbulb or other flash device for flash photography the battery voltage may be decreased because during the ignition of the flashbulb the batteries are being used or drained and the shutter may actually operate unreliably in view of this voltage decrease during the taking of a flash photograph.

Another problem encountered in this type of camera is that in some arrangements, if a flashbulb is provided in a camera, an additional switch must be provided in series with the flash-synchronizing contacts, which should essentially close in conjunction with the opening movement of the shutter in order to prevent the flash from taking place in daylight photography, and this additional switch must be so constructed as to close only when flash photography is performed. Otherwise, additional mechanism is required so that the synchronizing contacts of the flash unit can not be closed upon operation of this shutter. In either case, additional space for this mechanism is required and increased costs ensue in the construction of the shutter.

SUMMARY OF THE INVENTION

It is a principal object of the invention to provide an electrically-operated camera shutter eliminating the problems of the aforementioned electrically operated shutters for cameras.

Another object of the invention is to provide an electrically-operated camera shutter which can effect change-over from daylight photography to flash photography modes, or vice versa, automatically, as well as manually.

Another object is to provide an electrically-operated camera shutter and associated circuitry in which it is possible to take natural light photographs if the brightness of the subject being photographed is higher than a predetermined and set level and to automatically change-over for flash photography when the brightness is lower than the preset level without need of the power source to operate the shutter when connected in circuit for flash photography.

In the electrically operated camera shutter according to the invention, circuit means are provided comprising an electromagnet having an armature for controlling closing of an electrically operated shutter upon its deenergization. Shutter-operating mechanism is provided for opening and closing the shutter and has means for closing the shutter under control of the electromagnet when variable exposure times are to be effected as a function of the brightness of the object being photographed and for closing the shutter at a fixed exposure time period for flash photography. Change-over means in the circuit place the electromagnet in circuit for timed exposures and out-of-circuit for a fixed exposure time for flash photography either automatically or manually, depending upon the embodiment of the invention.

The shift from daylight photography to flash photography essentially eliminates the energizing of the electromagnet when flash photography is to be effected. This elimination takes place automatically and even when in a manual mode of operation, since the manual arrangement provides for the change-over being preset manually. In the completely automatic embodiment of the invention it makes the change-over to and from both modes automatically. The mechanism of the shutter is the same for both embodiments and control of flash photography by not energizing the electromagnet avoids the necessity of complex mechanisms and switching arrangements and insures that the full power of the power source is available to either control the shutter or ignite the flash device.

Other objects and advantages of the camera shutter in accordance with the invention will appear from the following description of an example of the invention, and the novel features will be particularly pointed out in the appended claims.

DESCRIPTION OF THE PREFERRED EMBODIMENTS

Figure 1:
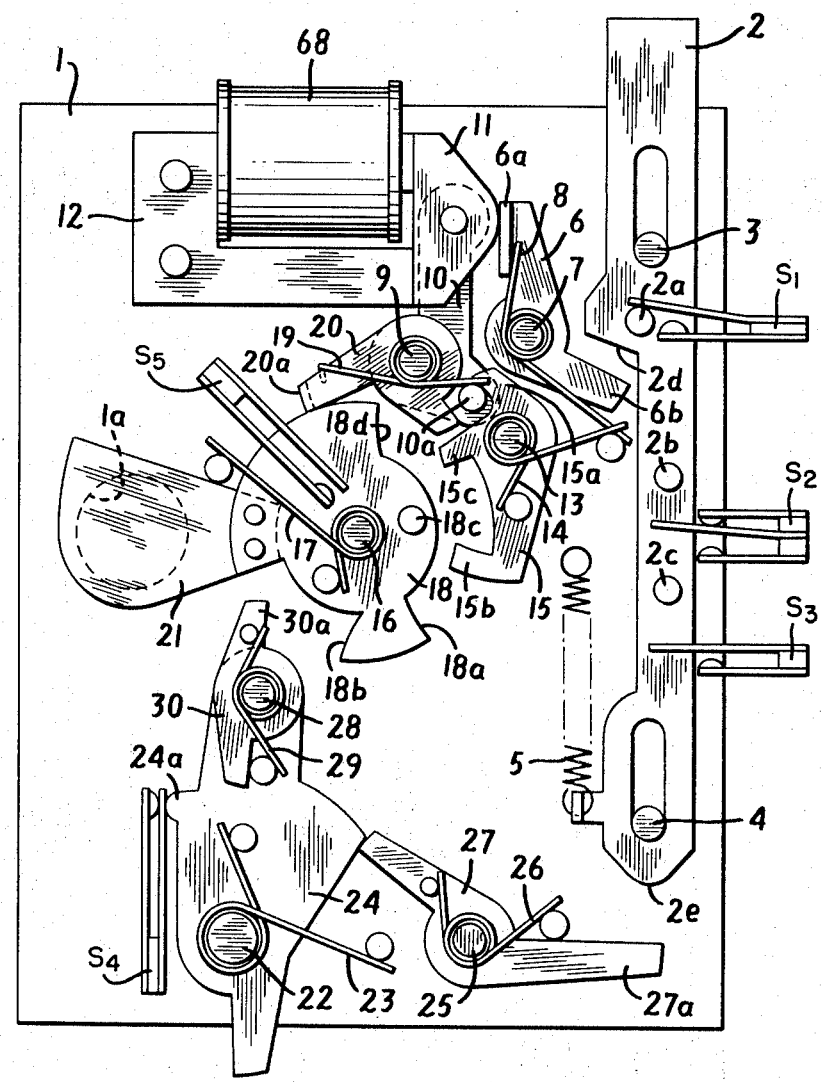
FIG. 1 is a diagrammatic elevation view of an electrically operated camera shutter embodying the invention and illustrating the shutter in a cocked condition.

A camera shutter embodying the invention is diagrammatically illustrated in FIG. 1 in a cocked condition and in which a shutter base plate 1 having an aperture 1a for taking of exposures supports the various mechanisms. A shutter releaese plate or lever 2 for taking of exposures is illustrated as having elongated slots in which are disposed fixed pins 3, 4 for guiding its axial movement upwardly and downwardly when it is depressed for taking an exposure and is then subsequently released. The shutter release plate 2 is constantly biased in an upward direction by a biasing spring 5. Fixed pins 2a, 2b, and 2c are spaced axially thereon for controlling switches of an electrical circuit of the shutter, when the release plate is depressed and as later described. An upper pin 2a in the raised position of the shutter release plate maintains a power switch $S_1$ in an open position. A first change-over switch $S_2$ is normally closed and has a flexible or resilient movable contact contacting one of its fixed contacts as illustrated and a second change-over $S_3$ is normally open. These two switches are actuated by the two lower pins 2b, 2c of the shutter release lever or plate 2 as later explained.

A pressure-applying lever 6 is pivotally mounted on a pivot 7 and is biased in a counterclockwise direction by a biasing spring 8 bearing against a fixed pin as illustrated and a tab 6a of the lever itself. A pivot 9 pivotally mounts a control lever 10 connected to an armature 11 of an electro-magnet 12. The pressure-applying lever 6 bears against the armature 11 and urges it to a position correspondong to its "attracted" position illustrated in the drawing.

A pivot 13, about which a spring 14 is disposed, pivotally supports a time control or timing lever 15 and its associated spring 14 biases this time control lever 15 in a counterclockwise direction so that an arm or projection 15a thereof contacts and bears against a pin 10a on the pressure-applying lever 10. A shutter pivot 16 about which is disposed a driving spring 17 pivotally mounts a shutter-operating plate 18 which is biased in a clockwise direction by the driving spring 17.

The pivot 9 of the pressure-applying member 10 has coaxially mounted thereon a lock lever 20 biased in a clockwise direction by a biasing spring 19 bearing both on a part of the lock lever and on the pin 10a of the pressure-applying lever 10. The lock lever is provided with a tab 20a extending normal to the plane of the drawing and riding on a profile of a sector or projection of the shutter-operating plate 18, as illustrated. A shutter blade 21 is mounted on this sector or projection. The shutter blade 21 opens and closes the exposure aperture 1a, as later explained. The shutter-operating plate has a second projection or sector having a surface 18a and another opposite surface 18b. The shutter-operating plate carries a pin 18c which closes a synchronizing switch 5 which is normally open, as later explained, and it can be locked in position by the lock lever tab 20a by engaging the surface 18b, as will be hereinafter explained.

A drive lever pivot 22 has a biasing spring 23 mounted thereon for pivotally mounting and biasing a drive lever 24 in a clockwise direction. A projection or protuberance 24a thereon closes a timing switch $S_4$ when the shutter is in a cocked condition and allows it to open, as later explained. This drive lever is releasably locked by a release lever 27 pivotally mounted on a pivot 25 and biased in a counterclockwise direction by a biasing spring 26 positioning it to maintain the drive lever releasably locked.

The drive lever has fixed thereon an arm thereof, a pivot 28 about which is disposed a biasing spring 29 co-operating with fixed pins on the drive lever as illustrated for biasing an auxiliary lever 30 in a counterclockwise direction.

Figure 5:
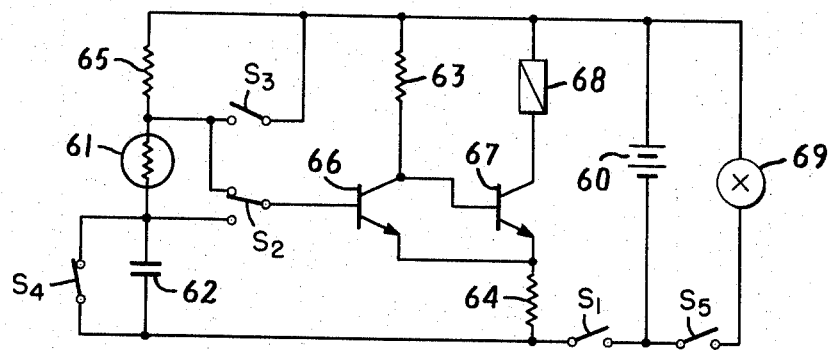
FIG. 5 is a schematic view of electrical circuitry for the camera shutter in FIG. 1.

A first embodiment of an electric circuit which cooperates with the mechanism described heretofore is illustrated in FIG. 5 and comprises a source of power 60 across which are connected, in a voltage divider configuration, a photoconductive cell 61 and a capacitor 62. The photoconductive cell has a variable resistance varying as a function of the brightness of an object or scene being photographed and which is sensed by the cell. Fixed resistances 63, 64, 65 are connected to first and second transistors 68, 67 in a configuration as shown. The various switches $S_1$–$S_5$ are in the condition shown corresponding to the cocked or charged state of the shutter.

When the shutter release plate 2 is depressed, the power switch $S_1$ closes first and the electric circuit operates as a circuit for detecting the brightness of the field being photographed. Since the timing switch $S_4$ is closed, a voltage divided by the photoconductive cell 61 and the fixed resistance 65 in series therewith is applied at the base of the first transistor 66. The resistance of the photoconductive cell is a function of the brightness of the light being sensed and if this brightness is higher than a predetermined level, the first transistor 66 will assume an "off" condition and the second transistor 67 is rendered conductive or assumes an "on" condition so that the electromagnet operating coil 68 is electrically energized and attracts the armature 11 thereto or holds it in its attracted position in which it is already biased and held by the pressure-applying lever 6.

Figure 2:
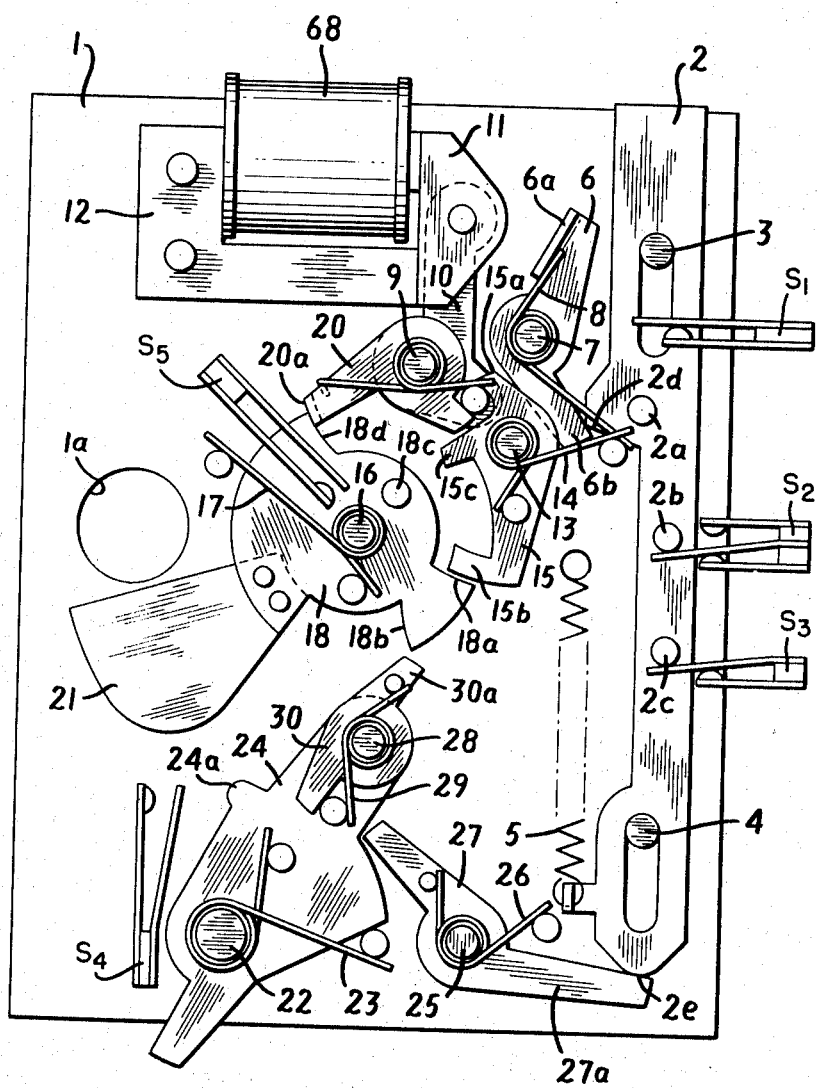
FIG. 2 is a schematic view of the electrically operated camera shutter in FIG. 1 illustrated in a mode of operation for daylight photography.

As the shutter release lever 2 is further depressed downwardly, a side projection surface 2d thereof engages an arm 6b of the pressure-applying plate causing it to be rotated in a clockwise direction against the action of its spring in view of the manual force applied to the shutter release lever 2 as it is depressed. Since the electromagnet operating coil is energized, the armature 11 maintains its "attracted" position. As the shutter release lever 2 continues its movement downwardly, the first change-over switch $S_2$ will be changed over to its other fixed contact, which is connected to the capacitor, and the second change-over switch $S_3$ will be closed. The electromagnet continues magnetized. Eventually, the shutter release lever 2 reaches a position in which a tip 2e will strike an arm 27a of the release lever 27 and allow it to turn clockwise, accordingly the drive lever 24 is freed from its locked condition so that it turns clockwise. As the drive lever 24 rotates in a clockwise direction, an arm 30a of the auxiliary lever 30 strikes the projection surface 18b of the shutter-operating plate 18, causing it to turn in a counterclockwise direction, so that the shutter blade or sector 21 opens the exposure aperture 1a as shown in FIG. 2.

The counterclockwise rotation of the shutter-operating plate 18 is limited, since the opposite side projection side 18a will engage a projection or protuberance 15b of the time control lever 15, thereby temporarily holding the shutter operating plate in a position in which the shutter is opened and timed, as will be noted hereinafter. Because of this retention or restraint on the shutter-operating plate 18, the synchro-switch $S_5$ will not be closed by the pin 18c, and the lock lever 20 locks the shutter-operating plate 18 by engagement of its tab 20a with the sector side surface 18d, so that the shutter blade or sector remains in an open position.

Simultaneously with the movement of the drive lever 24 in a clockwise direction, the timing switch $S_4$ opens and the charging of the storage capacitor 62 proceeds in dependence upon the brightness of the scene being photographed. If the brightness is sufficient for daylight photography, as is assumed in this case, the voltage charge reaches a level at which the first transistor 66 is rendered conductive and is in an "on" condition and the second transistor 67 will assume an "off" condition so that the electromagnet 12 is de-energized.

When the electromagnet is de-energized, the control lever 10 is free to turn and is biased in a clockwise direction through its pin 10a so that it turns in a clockwise direction, and the lock lever 20 is also caused to turn clockwise and thereby release the shutter-operating plate 18. The open-close or shutter-operating plate 18 turns clockwise under control of its own biasing or driving spring 17 and the shutter blade 21 closes the exposure aperture 1a.

The above description with respect to the mode of automatic operation of the invention relates to a situation in which the brightness of the subject being photographed is higher than a predetermined level, thereby allowing daylight photography. In order to automatically carry out flash photography, the mode of automatic operation will now be described. When the shutter release lever 2 is depressed in the position shown in FIG. 1, the power supply switch $S_1$ is closed as before described. The operating sequence in this case is the same as before up to the direction of the brightness of the subject by means of the electric circuit. In this case, the brightness is at such a reduced level that the electromagnet operating coil 86 is not electrically energized.

Figure 3:
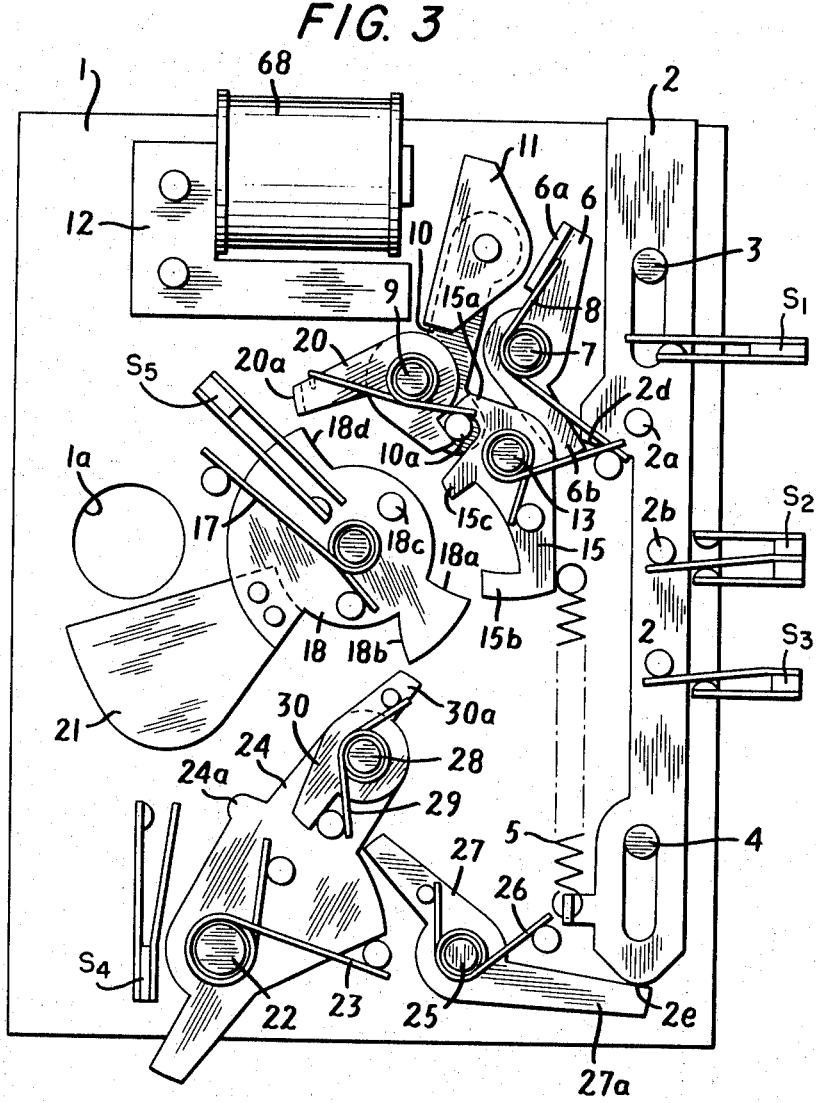
FIGS. 3 and 4 are schematic elevation views of the electrically operated camera shutter in FIG. 1 illustrating a mode of operation for flash photography.

Thus, as the shutter release plate 2 continues its downward movement and the pressure-applying lever 6 is turned clockwise, then the control lever 10 will turn clockwise immediately thereafter and the time control or timing lever 15 and the lock lever 20 will displace at the same time. Thus, when the release lever 27 turns clockwise after being actuated by the downward movement of the shutter release plate, and the change-over switches $S_2$, $S_3$ have been changed over, the drive lever 24 is released from its temporarily locked position and turns clockwise and imparts a shock or impact on the shutter-operating plate 18 so that it turns counterclockwise. This state is shown in FIG. 3.

Figure 4:
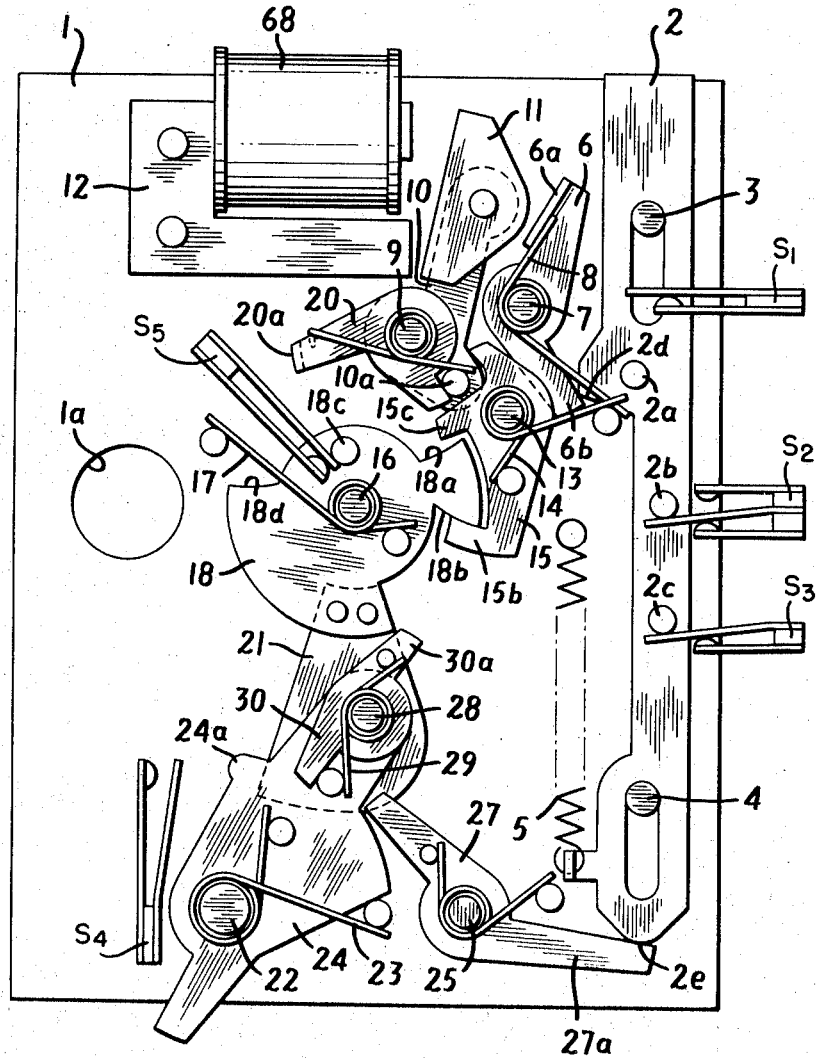

The shutter-operating plate 18 continues its counterclockwise rotation due to its inertia and its projection side 18a travels until it strikes a protuberance 15c of the time control lever 15 and it then closes the synchro-switch $S_5$, thus allowing the flashbulb 69 to be energized and emit light for flash photography. When the protuberance side 18a of the shutter-operating plate strikes the protuberance 15c the time control lever 15 is caused to turn clockwise because of the shock or impact force and the protuberance 15b engages the opposite side 18b of the secondary protuberance on the shutter-operating plate 18. Thus, clockwise rotation of the open-close plate 18 is obstructed until the time control lever 15 turns counterclockwise under control of its own biasing spring and releases the shutter-operating plate as shown in FIG. 4. After the release thereof, the open-close plate 18 turns clockwise under control of its own biasing or driving spring and the shutter blade 21 closes the lens or exposure aperture 1a thus completing a flash photograph sequence automatically controlled by the shutter mechanism according to the invention.

Figure 6:
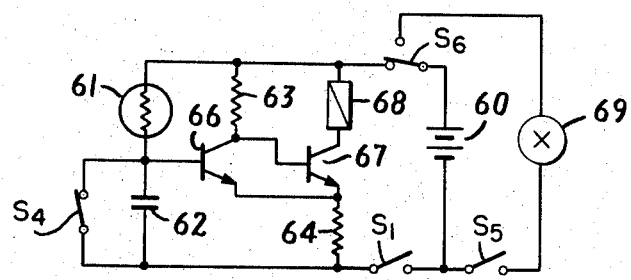
FIG. 6 is a second embodiment of the electrical circuitry for use with the camera shutter of FIG. 1.

In the combination of the shutter illustrated in FIG. 1 and the electric circuit of FIG. 5, daylight photography and flash photography are automatically carried out. The change-over from one mode to another is completely automatic. When daylight photography is being effected variable exposure times are possible dependent upon the brightness of the object being photographed; when the circuit shifts over automatically for flash photography a fixed exposure time is established. The circuitry can be changed so that daylight photography without use of a flashbulb can be carried out automatically as before, and in the event flash photography is to be carried out the flash mode can be preset manually. A circuit for this type of operation is illustrated in FIG. 6.

The shutter mechanism of FIG. 1 can be used in conjunction with this second type of circuit. In the circuit in FIG. 6, the elements are designated with the same reference numerals as those in FIG. 5 when they correspond thereto. In this circuit, the change-over switches $S_2$, $S_3$ are eliminated and a single change-over $S_6$ is connected with a movable contact connected to the positive terminal of the power source 60 and the two fixed contacts are connected to the flash unit or flashbulb 69 and the electromagnet operating coil 68 as illustrated.

In the second circuit embodiment the various switches are illustrated in the condition thereof when the shutter is in a charged condition, and in a mode for automatic sensing of the brightness of an object to be photographed and taking of daylight photographs. In this instance, the power supply is connected to the electric sensing and delay circuit including the electromagnet operating coil 68 through the change-over switch $S_6$. The switch $S_6$ is closed to establish connection to the electromagnet. Operations are essentially in the same manner as the first embodiment described with respect to daylight photography. That is to say, the shutter will operate the same as before in the situation where the brightness of the object being photographed is higher than a particular level.

In the event that flash photographs are to be taken, the change-over switch $S_6$ can be interlocked, by means for a manual presetting of this mode, with the synchro-switch $S_5$ for movement therewith to establish a series circuit placing the power source 60 and the flashbulb 69 in series, since it is operated to the position contacting the fixed contact connected to the flashbulb. In this condition, no current is applied to the operating coil 68 of the electromagnet 12. The shutter will operate the same as in the first embodiment corresponding to a condition in which the brightness of the subject is lower than the predetermined level and flash photography is effected.

Thus in both embodiments of the invention, flash photography is effected without use of the delay circuit so that the power supply is applied solely to the flashbulb and there is no possibility of mis-operation of the shutter. In those instances where the camera is operated to effect daylight photography, the power source applies its power to the shutter and the shutter will operate precisely since the power source is being used only for control of the shutter.

What I claim and desire to secure by Letters Patent is:

1. In an electrically operated camera shutter, circuit means comprising an electromagnet having an armature for controlling closing of an electrically operated shutter upon de-energization thereof, shutter-operating mechanism for opening and closing said shutter having means comprising a delay circuit for closing said shutter under control of said electromagnet when variable exposure times are to be effected and means for closing the shutter at a fixed exposure time period for flash photography, change-over means in said circuit means for placing the electomagnet in circuit for timed exposures and out of circuit for fixed exposure times for flash photography.

2. In an electrically operated camera shutter, circuit means comprising means for variably controlling the length of exposure periods as a function of the brightness of a scene being photographed and when said brightness is above a given level, mechanical means for mechanically controlling the exposure period as a substantially fixed period of time when the brightness of said scene is below said level and flash photography must be effected, change-over means disposed in said circuit means and said mechanical means controlling as a function of said brightness the variable controlling of the exposure periods and the fixed exposure time period, and flash means under control of said change-over means for effecting flash photography when fixed exposures are established by said mechanical means.

3. In an electrically operated camera shutter, circuit means having light-responsive sensing means sensing in operation the brightness of a scene being photographed and means including an electromagnet for variably controlling exposure time of a shutter when said brightness of said scene is above a given level and as a function of the brightness of said scene, mechanical means for controlling the exposure time when said brightness is below said level, change-over means coactive with said circuit means and said mechanical means for precluding energizing of said electromagnet when said brightness sensed is below said level thereby to control said exposure time solely mechanically and thereby have a fixed time period, and means energized in operation under control of said change-over means for energizing a flash device when said mechanical means controls said exposure time.

4. In an electrically operated camera shutter according to claim 3, in which said circuit means comprises a power source, and in which said change-over means comprises means connecting said power source in series with the last-mentioned means when said brightness is below said brightness level.

5. In an electrically-operated camera shutter according to claim 3, in which said electromagnet comprises an armature and in which said mechanical means comprises a pressure-applying lever applying a force to said armature to bias it to a position to which it is attracted when said electromagnet is energized, a control lever connected to said armature, a timing lever coactive with said control lever for controlling the exposure time when said electromagnet is not energized, a shutter-operating member controlled by said timing member for closing of the shutter, and means disenabling said pressure-applying member when said brightness is below said level when a photographic exposure is taken, whereby the exposure time is controlled by said mechanical means.

6. In an electrically-operated camera shutter according to claim 3, in which said electromagnet comprises an armature enabling said mechanical means for controlling the exposure time mechanically.

7. In an electrically-operated camera shutter according to claim 3, inluding mechanical means for enabling said change-over means.

8. In an electrically-operated camera shutter according to claim 3, in which said circuit means comprises a delay circuit, and in which said change-over means comprises means disenabling the delay circuit and means enabling the mechanical means when said brightness is below said level.

* * * * *